(12) United States Patent
Djeroro et al.

(10) Patent No.: US 12,516,468 B2
(45) Date of Patent: Jan. 6, 2026

(54) COLLAPSIBLE CREASE-SMOOTHING CABINET WITH MULTILAYER CURTAIN

(71) Applicant: SEB S.A., Ecully (FR)

(72) Inventors: Amar Djeroro, Givors (FR); Pierre Durif, Monsteroux-Milieu (FR)

(73) Assignee: SEB S.A. (FR)

( * ) Notice: Subject to any disclaimer, the term of this patent is extended or adjusted under 35 U.S.C. 154(b) by 36 days.

(21) Appl. No.: 18/566,376

(22) PCT Filed: May 23, 2022

(86) PCT No.: PCT/EP2022/063935
§ 371 (c)(1),
(2) Date: Dec. 1, 2023

(87) PCT Pub. No.: WO2022/253620
PCT Pub. Date: Dec. 8, 2022

(65) Prior Publication Data
US 2024/0247432 A1  Jul. 25, 2024

(30) Foreign Application Priority Data
Jun. 2, 2021 (FR) ..................... 2105815

(51) Int. Cl.
*D06F 73/02* (2006.01)
*B32B 5/02* (2006.01)
(Continued)

(52) U.S. Cl.
CPC .............. *D06F 73/02* (2013.01); *B32B 5/02* (2013.01); *B32B 27/12* (2013.01); *B32B 27/40* (2013.01);
(Continued)

(58) Field of Classification Search
CPC .......... D06F 73/00; D06F 73/02; D06F 58/14; D06F 58/203; B32B 5/02; B32B 27/12;
(Continued)

(56) References Cited

U.S. PATENT DOCUMENTS 1,382,081 A * 6/1921 Heiliger ................ F04B 45/022
29/454
1,452,066 A * 4/1923 Cave ....................... D06F 58/10
312/351
(Continued)

FOREIGN PATENT DOCUMENTS

GB         1414041 A      11/1975
KR   20170141489 A  *  12/2017

OTHER PUBLICATIONS

International Search Report for PCT/EP2022/063935 mailed Sep. 15, 2022. 4 pgs.

*Primary Examiner* — Ismael Izaguirre
(74) *Attorney, Agent, or Firm* — Lerner David LLP

(57) ABSTRACT

A crease-smoothing cabinet includes
a base;
a top extending opposite and at a distance from the base; and
an expandable curtain intended to extend between the base and the top, so that the base, the top and the curtain together define an enclosed space in the crease-smoothing cabinet when the curtain is expanded and attached to the base and the top.
The curtain includes a multilayer textile wall including a first layer and a second layer, wherein the first layer is made of a textile material made of elastic fibers and the second layer is made of a waterproof material.

12 Claims, 11 Drawing Sheets

(51) Int. Cl.
  *B32B 27/12* (2006.01)
  *B32B 27/40* (2006.01)
  *D06F 58/14* (2006.01)
  *D06F 58/20* (2006.01)
  *D06F 73/00* (2006.01)

(52) U.S. Cl.
  CPC ............ *D06F 58/14* (2013.01); *D06F 58/203* (2013.01); *B32B 2250/40* (2013.01); *B32B 2262/0276* (2013.01); *B32B 2274/00* (2013.01); *B32B 2307/51* (2013.01); *B32B 2307/7265* (2013.01); *B32B 2509/00* (2013.01)

(58) Field of Classification Search
  CPC ............... B32B 27/40; B32B 2250/40; B32B 2262/0276; B32B 2274/00; B32B 2307/51; B32B 2307/7265; B32B 2509/00
  See application file for complete search history.

(56) References Cited

U.S. PATENT DOCUMENTS

| | | | | |
|---|---|---|---|---|
| 2,720,998 | A * | 10/1955 | Potter | B65D 88/18 |
| | | | | 222/105 |
| 3,190,012 | A * | 6/1965 | Gray | D06F 58/14 |
| | | | | 34/91 |
| 3,191,513 | A * | 6/1965 | Turner | G03B 17/045 |
| | | | | 29/454 |
| 3,709,005 | A * | 1/1973 | Keating | D06B 5/24 |
| | | | | 223/51 |
| 4,287,674 | A * | 9/1981 | Selivanov | F26B 9/006 |
| | | | | 312/3 |
| 8,464,562 | B1 * | 6/2013 | Colburn | D06F 73/02 |
| | | | | 68/222 |
| 8,904,665 | B2 | 12/2014 | Seiffert et al. | |
| 2002/0053607 | A1 | 5/2002 | Gaaloul et al. | |
| 2003/0126691 | A1 | 7/2003 | Gerlach et al. | |
| 2016/0348301 | A1 * | 12/2016 | Spitz | D06F 58/14 |

* cited by examiner

[Fig. 1]
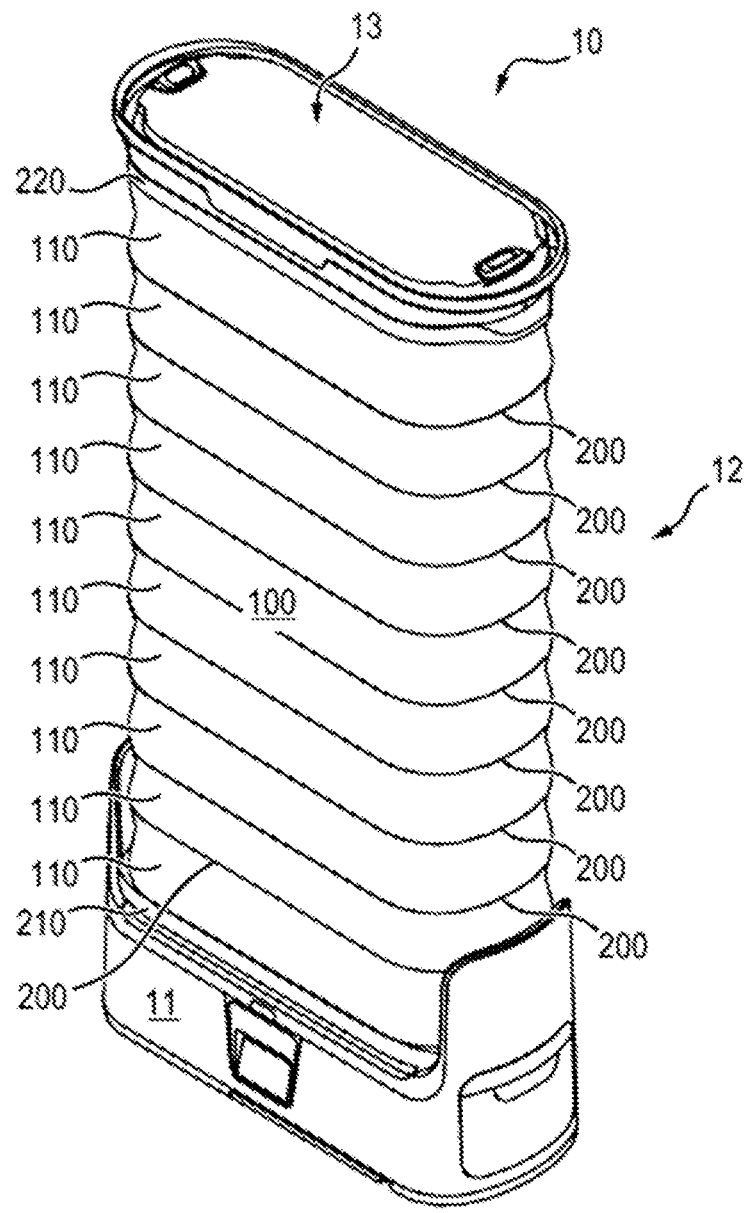

[Fig. 2]
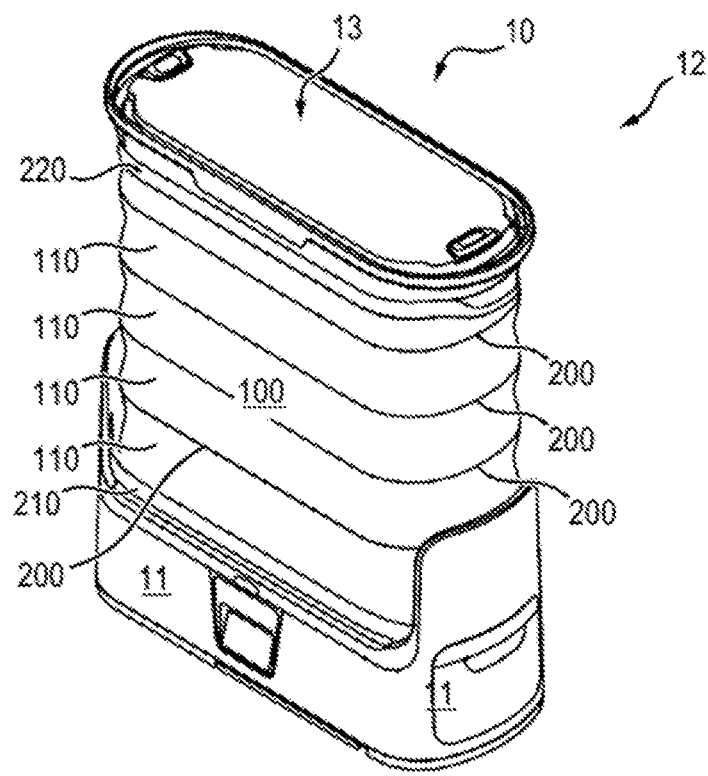

[Fig. 3]
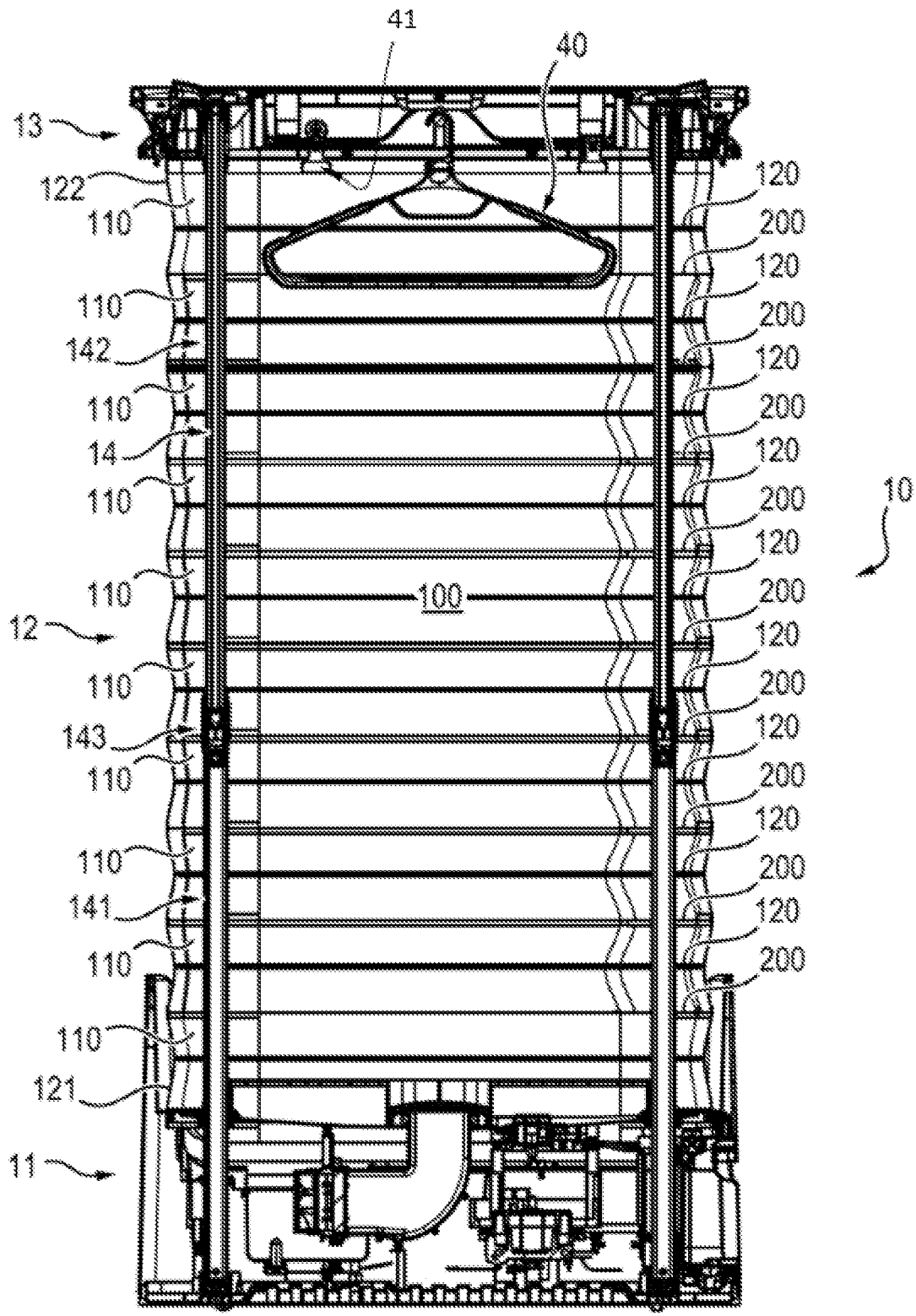

[Fig. 4]
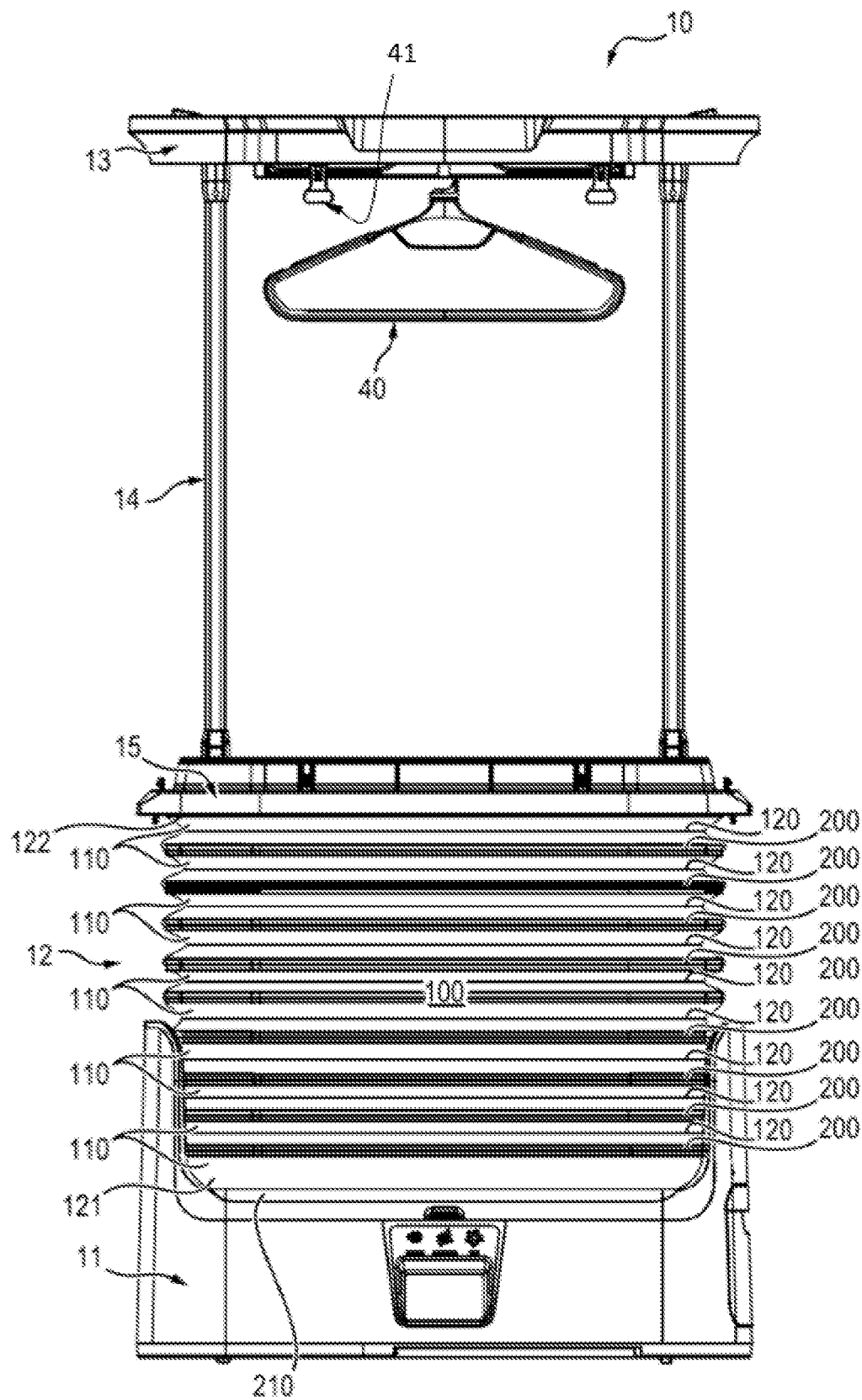

[Fig. 5a]
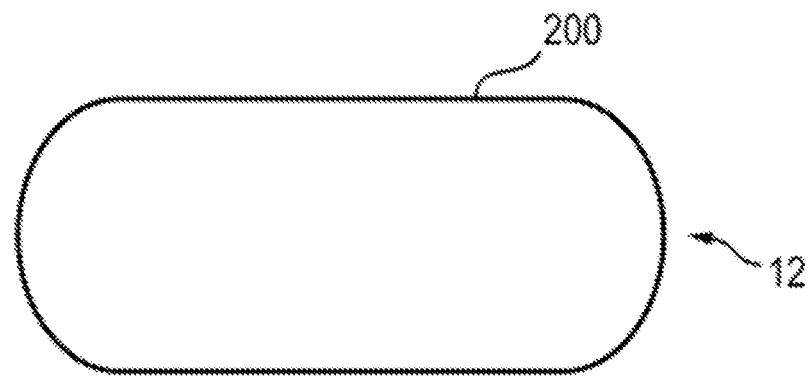
[Fig. 5b]
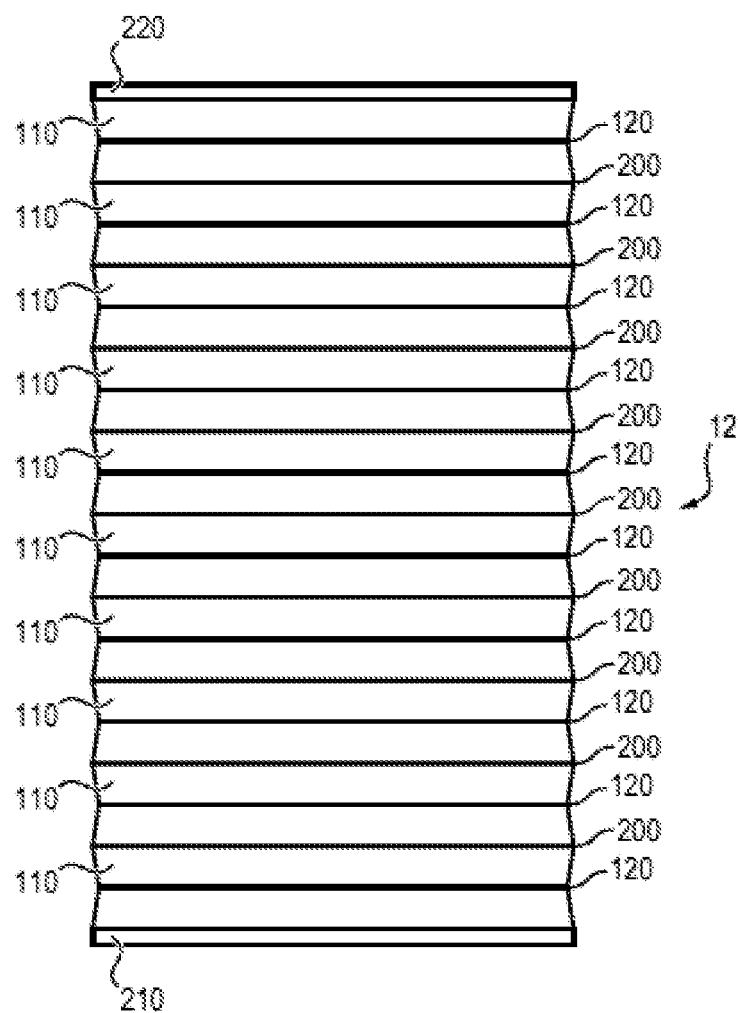

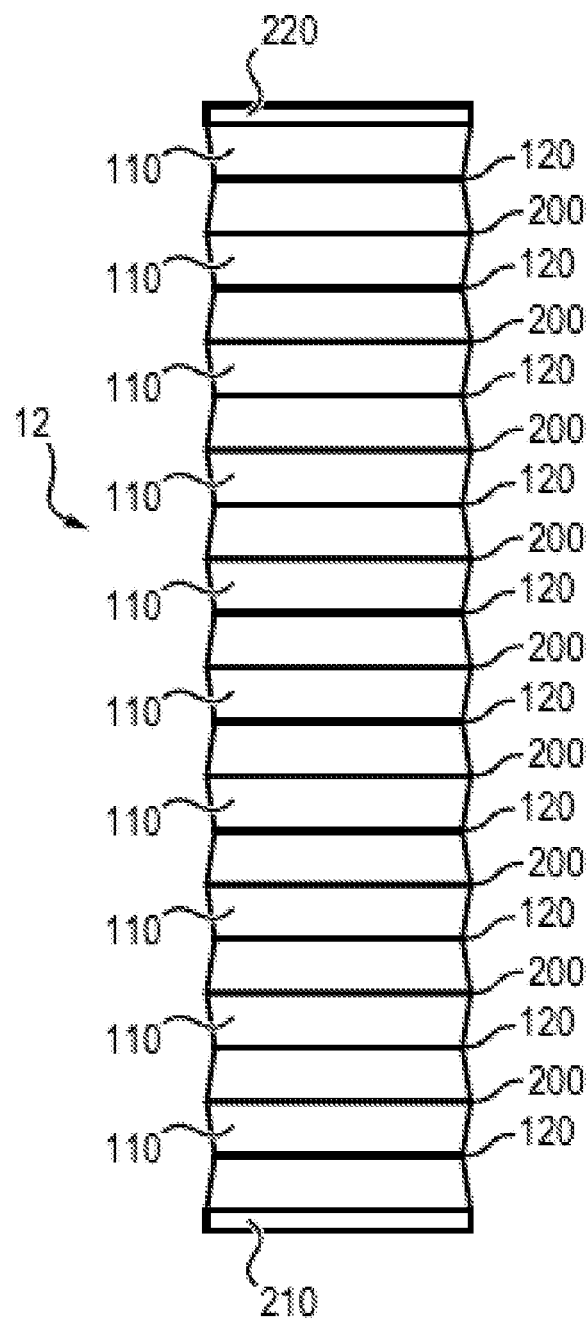
[Fig. 5c]

[Fig. 6a]
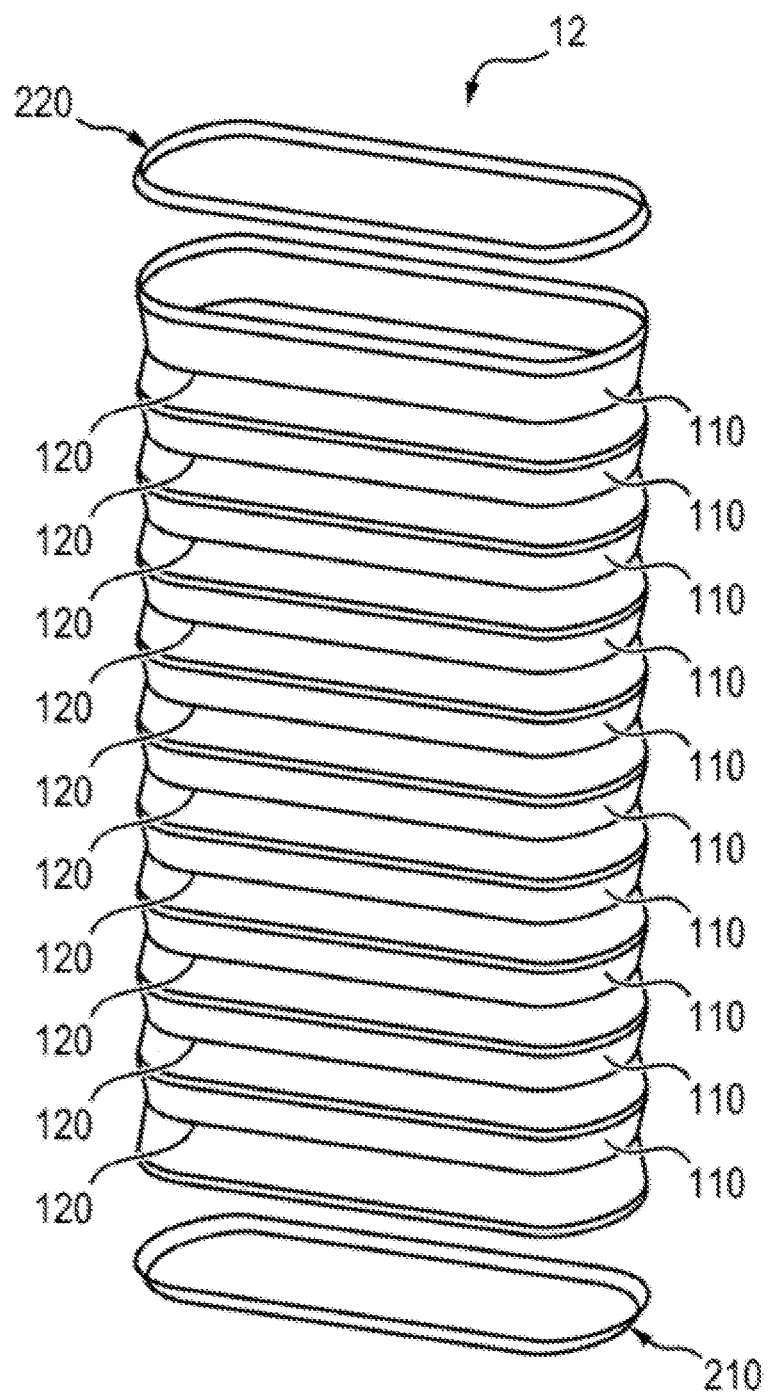

[Fig. 6b]
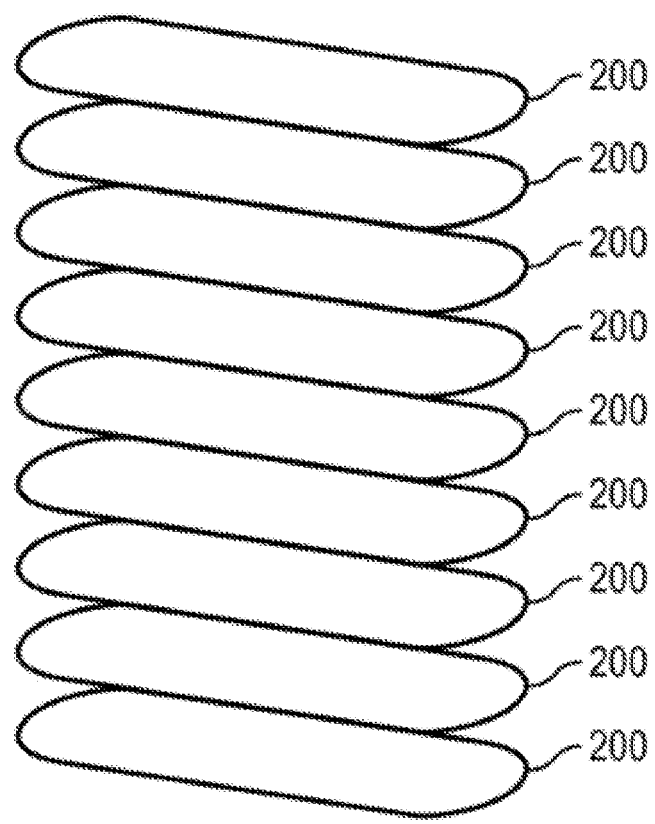
[Fig. 6c]
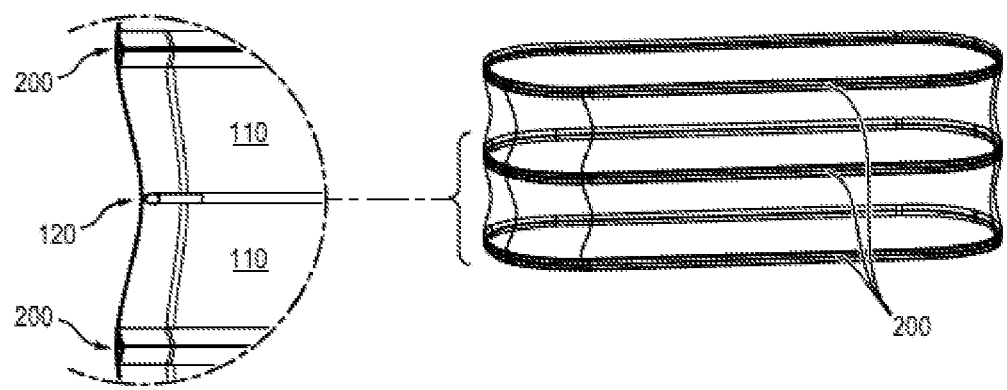

[Fig. 7]
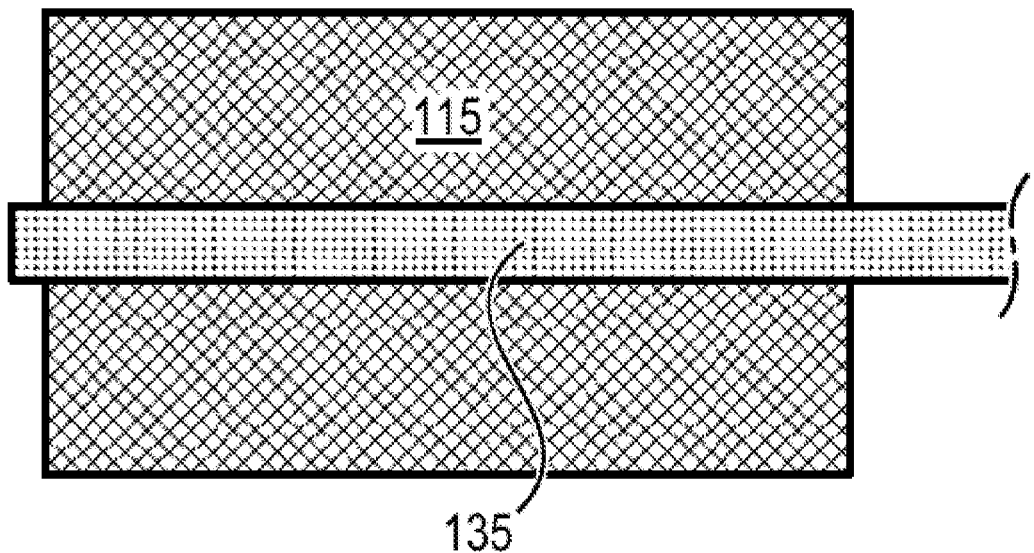
[Fig. 8]
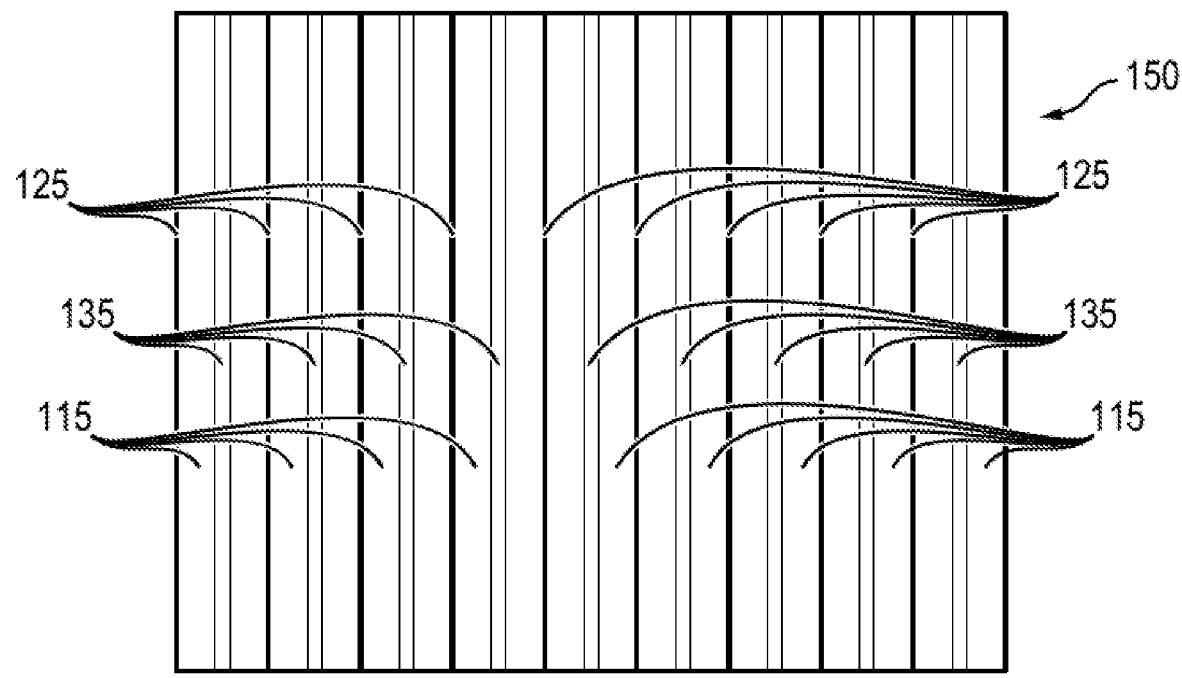

[Fig. 9]
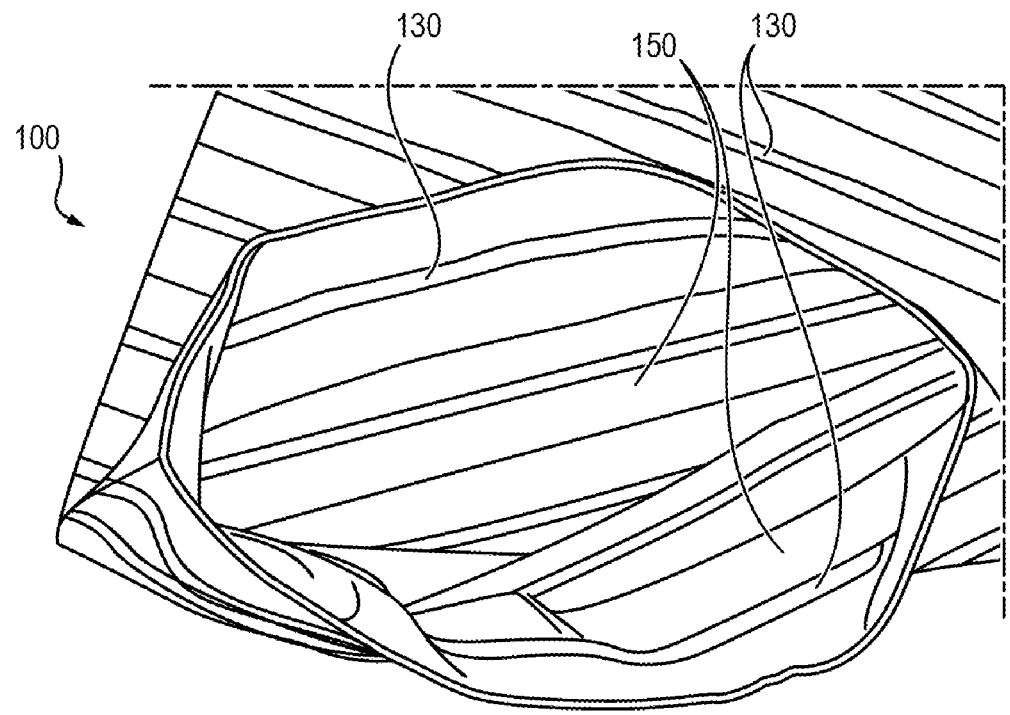
[Fig. 10]
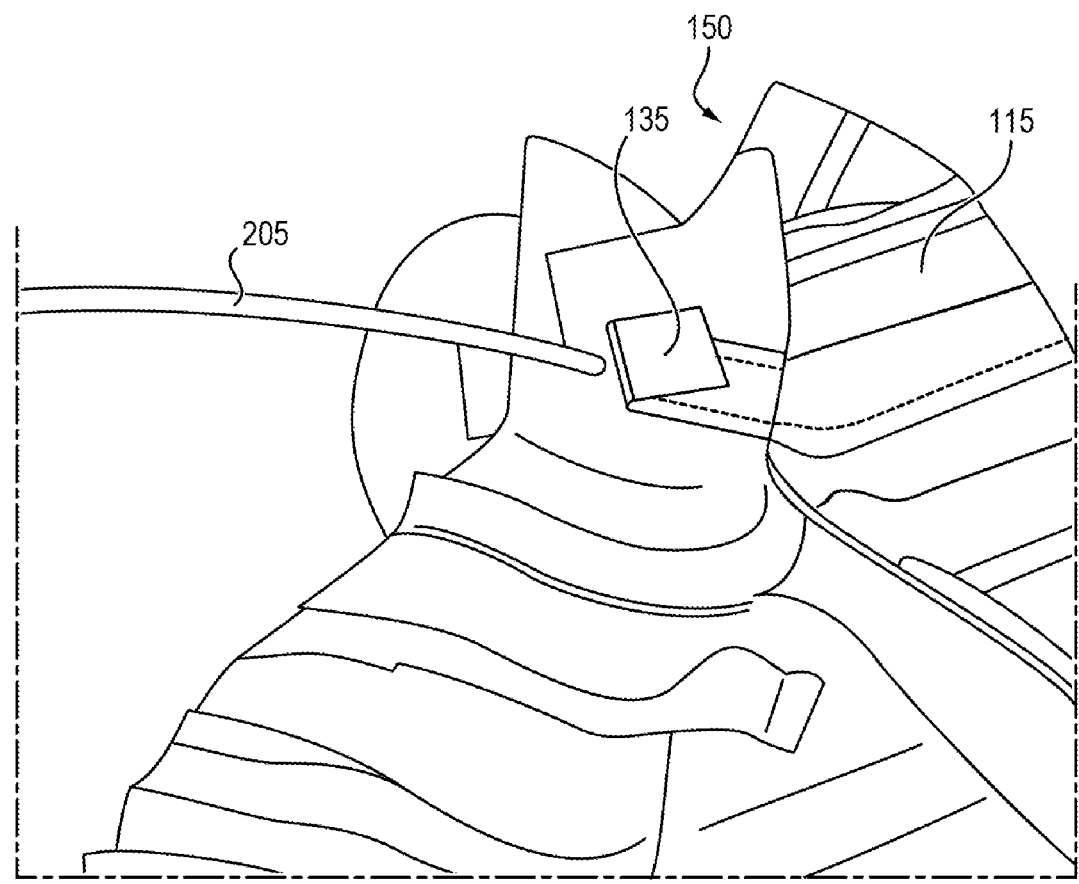

[Fig. 11]
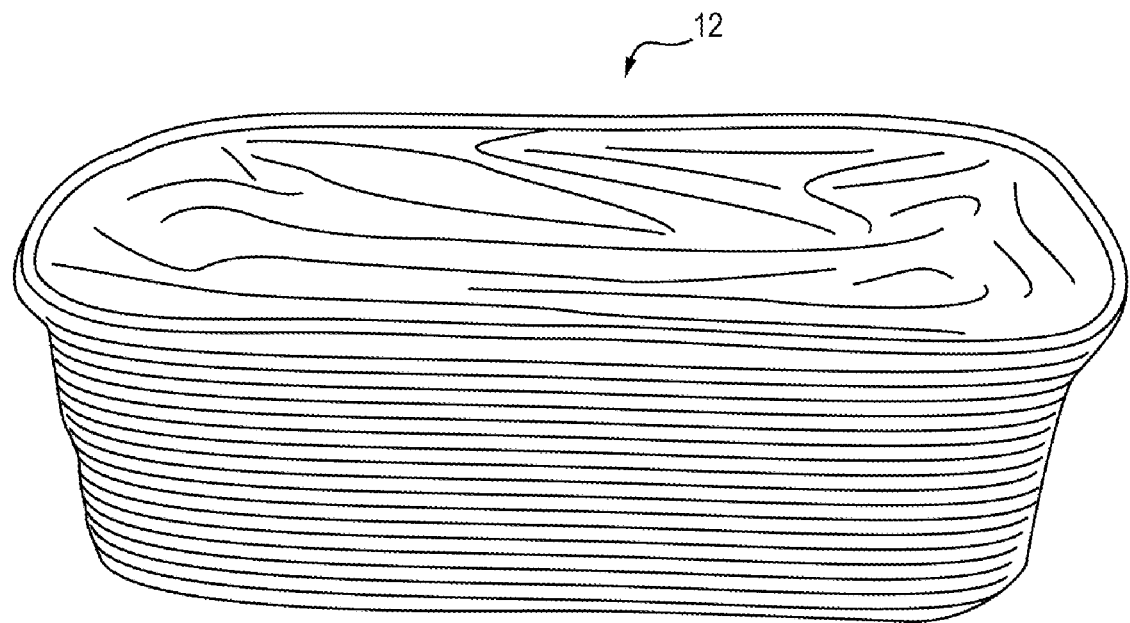
[Fig. 12]
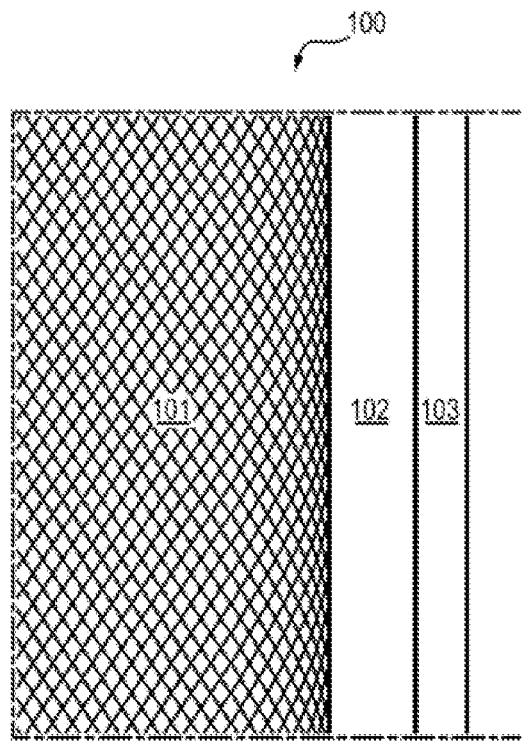

COLLAPSIBLE CREASE-SMOOTHING CABINET WITH MULTILAYER CURTAIN

CROSS-REFERENCE TO RELATED APPLICATIONS

The present application is a national phase entry under 35 U.S.C. § 371 of International Application No. PCT/EP2022/063935, filed May 23, 2022, published in French, which claims priority to French Application No. 2105815 filed Jun. 2, 2021, the disclosures of which are incorporated herein by reference in their entireties.

FIELD OF THE INVENTION

The present invention relates to the field of crease-smoothing cabinets. In particular, it aims to provide a collapsible crease-smoothing cabinet.

STATE OF THE ART

In the field of linen care, handheld crease-smoothing appliances make it possible, through an action of the user holding the handheld crease-smoothing appliance near the item, to remove creases from a fabric item such as a garment. However, these appliances require the user to take direct action throughout the smoothing process, which results in a considerable amount of time and effort for the user.

Drying cabinets can also be used to dry items placed by the user in the enclosed space formed by the cabinet. Hot air is injected into the enclosed space so as to dry the items placed in the drying cabinet without requiring user action. Nevertheless, these cabinets are limited to drying items and in particular do not allow items placed in the drying cabinet to be smoothed.

Crease-smoothing cabinets allow items to be dried or smoothed without the need for direct user intervention.

A crease-smoothing cabinet comprises a top, a base and a curtain. The top, base and curtain form an enclosed space in the crease-smoothing cabinet. The user puts one or more items in the space in the crease-smoothing cabinet and initiates a cycle of actions to be carried out by the cabinet.

Nevertheless, most known crease-smoothing cabinets are stationary and cannot be easily assembled, disassembled or moved. As a result, their use is limited to the room in which they are installed; otherwise, they require time-consuming uninstallation, transport and reinstallation for the user. Moreover, these crease-smoothing cabinets take up a considerable amount of space.

Some crease-smoothing cabinets, such as the ones described in EP 1 471 178 A1 and EP 1 600 551 A1, comprise a curtain interposed between a base and a top. A zipper is provided on the curtain, the user being able to open the zipper to access the interior of the cabinet in order to put in or take out a garment, then to close the zipper again before running a smoothing cycle.

Documents EP 1 057 923 A1, EP 1 215 330 A1, KR 100813048 B1, KR 20170141489 A, KR 100813048 B1 and KR 20170141489 describe collapsible crease-smoothing cabinets comprising a collapsible curtain interposed between a base and a top.

Nevertheless, the curtains on these crease-smoothing cabinets have basic materials and designs and do not make it possible to ensure satisfactory impermeability, reduce the presence of pleats and the appearance of creases on the curtain or make it easy to expand and collapse the curtain.

Poor impermeability of the crease-smoothing cabinet can cause steam to leak out of the cabinet during a smoothing cycle. Such steam leaks decrease the temperature and humidity inside the crease-smoothing cabinet, which can reduce the efficacy of the smoothing process. The presence of numerous pleats and the random appearance of creases on the curtain can give the curtain a rumpled appearance that can be visually unpleasant for the user, and the creases can also interfere with the collapse of the curtain on the crease-smoothing cabinet.

DISCLOSURE OF THE INVENTION

One purpose of the invention is to provide an improved collapsible crease-smoothing cabinet compared to the prior art.

An additional purpose of the invention is to provide a collapsible crease-smoothing cabinet that has satisfactory impermeability, is easy to collapse and expand, and reduces the appearance of creases.

An optional additional purpose of the invention is to provide a collapsible crease-smoothing cabinet that is satisfactorily easy to collapse and expand and that reduces the random appearance of creases, while also keeping manufacturing costs under control.

According to a first aspect, the invention relates to a crease-smoothing cabinet, comprising:
  a base;
  a top extending opposite to and at a distance from the base; and
  an expandable curtain designed to extend between the base and the top, so that the base, top and curtain together define an enclosed space in the crease-smoothing cabinet when the curtain is expanded and attached to the base and top.

The curtain comprises a multilayer textile wall comprising a first layer and a second layer. The first layer is made of a textile material comprising elastic fibers and the second layer is made of a waterproof material.

Some preferred but non-limiting features of the crease-smoothing cabinet described above are as follows, taken individually or in combination:
  the first layer is made of polyester;
  the first layer is made of textured and stretched polyester thread;
  the polyester of the first layer comprises elastane fibers;
  the first layer is an outer layer of the textile wall;
  the second layer is a waterproof polyurethane plastic film;
  the second layer is a thermoplastic polyurethane adhesive strip adapted to ensure hot bonding of the first layer onto the second layer;
  the textile wall further comprises a third layer made of a textile material comprising an elastic fiber;
  the third layer is made of polyester;
  the second layer is arranged between the first layer and the third layer;
  the curtain further comprises a frame, the textile wall and the frame being adapted to ensure accordion-folding and unfolding of the curtain;
  the cabinet further comprises fastening elements provided for removably attaching the curtain to the top, the crease-smoothing cabinet having:
  a working configuration wherein the curtain is attached to the top, the curtain being expanded so as to connect the top and the base; and
  an access configuration wherein the curtain is at least partially collapsed and detached from the top, so as to provide an open space between the curtain and the top for receiving an item for smoothing;

the curtain comprises a textile wall and a frame comprising a plurality of stays, the frame stays being arranged at regular intervals along the textile wall, and in that each portion of the textile wall located between two frame stays has a convex shape, so that the frame and the textile wall ensure accordion-folding and unfolding of the curtain;

the textile wall is formed by an assembly of a plurality of panels, two adjacent panels being connected to one another at a junction, each panel being adapted to ensure the placement of a frame stay;

each panel of the textile wall comprises a sheath arranged at a distance from a junction between said panel and an adjacent panel, said sheath being adapted to receive a frame stay;

the frame comprises between five and fifteen stays, preferably nine stays;

the curtain is adapted to be accordion-folded and unfolded substantially along a curtain axis orthogonal to the base, the textile wall forming a sleeve extending along the curtain axis and having an oblong transverse cross-section;

the frame stays are adapted to extend substantially in a plane perpendicular to the curtain axis;

the textile wall is adapted to be moved linearly along the curtain axis so as to cause the curtain to accordion-fold or unfold;

each frame stay has a substantially oblong shape;

the textile wall is formed from two textile half-walls connected to one another, preferably by sewing, each textile half-wall being formed by an assembly of a plurality of half-panels connected to the respective half-junctions, each half-panel comprising a half-sheath suitable for receiving a frame half-stay, and wherein each frame stay comprises two frame half-stays each inserted into a half-sheath of a respective half-panel and connected to one another;

the frame further comprises a first curtain connector provided to attach the textile wall to the base of the cabinet, and a second curtain connector provided to removably attach the textile wall to the top of the cabinet.

According to a second aspect, the invention relates to a method for manufacturing a textile curtain wall of a crease-smoothing cabinet according to the first aspect, comprising a step consisting in hot bonding the first layer onto the second layer.

According to a third aspect, the invention relates to a method of using a crease-smoothing cabinet according to the first aspect, comprising the following steps:

expanding the curtain then attaching the curtain to the top, in order to change from the access configuration to the working configuration; or detaching the curtain from the top then at least partially collapsing the curtain, in order to change from the working configuration to the access configuration.

The method of using the crease-smoothing cabinet can include the following steps:

expanding the curtain then attaching the guide part or curtain connector to the top, in order to change from the access configuration to the working configuration; or detaching the guide part or curtain connector from the top then at least partially collapsing the curtain, in order to change from the working configuration to the access configuration.

DESCRIPTION OF THE FIGURES

Other features, purposes and advantages of the present invention will appear upon reading the following detailed description, given as a non-limiting example, which will be illustrated by the following figures:

FIG. 1 is a schematic perspective view of a crease-smoothing cabinet according to one embodiment of the invention, the crease-smoothing cabinet being in a working configuration.

FIG. 2 is a schematic perspective view of a crease-smoothing cabinet according to one embodiment of the invention, the crease-smoothing cabinet being in a transport configuration.

FIG. 3 is a schematic sectional view of a crease-smoothing cabinet according to one embodiment of the invention, the crease-smoothing cabinet being in the working configuration.

FIG. 4 is a schematic perspective view of a crease-smoothing cabinet according to one embodiment of the invention, the crease-smoothing cabinet being in an access configuration.

FIG. 5a is a schematic top view of a frame stay of a crease-smoothing cabinet according to one embodiment of the invention.

FIG. 5b is a schematic front view of a curtain of a crease-smoothing cabinet according to one embodiment of the invention.

FIG. 5c is a schematic side view of a curtain of a crease-smoothing cabinet according to one embodiment of the invention.

FIG. 6a is an exploded schematic perspective view of a curtain of a crease-smoothing cabinet according to one embodiment of the invention.

FIG. 6b is an exploded schematic perspective view of frame stays of a crease-smoothing cabinet according to one embodiment of the invention.

FIG. 6c is a partial perspective view of a curtain of a crease-smoothing cabinet according to one embodiment of the invention.

FIG. 7 is a schematic top view of a half-panel of a textile wall of a crease-smoothing cabinet according to one embodiment of the invention.

FIG. 8 is a schematic top view of a textile half-wall of a crease-smoothing cabinet according to one embodiment of the invention.

FIG. 9 is a schematic perspective view of a textile wall of a crease-smoothing cabinet according to one embodiment of the invention.

FIG. 10 is a partial schematic perspective view of a textile wall and of a frame half-stay of a crease-smoothing cabinet according to one embodiment of the invention.

FIG. 11 is a schematic perspective view of a curtain of a crease-smoothing cabinet according to one embodiment of the invention.

FIG. 12 is a partial sectional view of a multilayer textile wall of a curtain of a crease-smoothing cabinet according to one embodiment of the invention.

DETAILED DESCRIPTION OF THE INVENTION

A crease-smoothing cabinet 10 comprises:

a base 11;

a top 13 extending opposite and at a distance from the base 11; and an expandable curtain 12 intended to extend between the base 11 and the top 13, so that the base 11, top 13 and curtain 12 together define an enclosed space in the crease-smoothing cabinet 10 when the curtain 12 is expanded and attached to the base 11 and top 13.

The curtain 12 can comprise a first end 121 adapted to be attached to the base 11, and a second end 122 opposite the first end 121 and adapted to be removably attached to the top 13 of the crease-smoothing cabinet 10.

A curtain axis 12 corresponds to a direction in which the curtain 12 collapses and expands. The curtain axis 12 is substantially orthogonal to the base 11 and to the top 13 of the crease-smoothing cabinet 10. The curtain axis 12 runs substantially through a center of the crease-smoothing cabinet 10. The terms inner (or internal), and outer (or external), respectively, are used such that the inner (or internal) part or face of an element is closer to the curtain axis 12 than the outer (or external) part or face of the same element. Thus, the enclosed space in the crease-smoothing cabinet 10 forms an internal volume of the crease-smoothing cabinet 10.

When the curtain 12 is expanded, the curtain 12 is substantially tensioned, or even stretched, between the base 11 and the top 13, the presence of pleats on the curtain 12 being limited.

When the curtain 12 is at least partially collapsed, the curtain 12 can be partially or totally folded onto itself. The curtain 12 can be at least partially placed on the base 11, if necessary resting inside the base 11.

An item to be smoothed, or a fabric item, can for example be a child's garment or soft toy. It is understood that the crease-smoothing cabinet 10 is suitable for receiving one or more items to be smoothed, and for simultaneously smoothing all items placed in the crease-smoothing cabinet 10.

The curtain 12 can be waterproof in order to maintain the desired humidity levels and temperature in the crease-smoothing cabinet 10 during the smoothing process. The curtain 12 can be elastic in order to facilitate the collapse or expansion of the curtain 12 while reducing the appearance of pleats.

The crease-smoothing cabinet 10 is suitable for smoothing creases from the fabric item(s) placed in the crease-smoothing cabinet 10. In addition to smoothing, the crease-smoothing cabinet 10 can also be used for drying and/or sanitizing, i.e., disinfecting to eliminate any bacteria, the fabric item(s) placed in the crease-smoothing cabinet 10. Thus, the user can choose a smoothing cycle corresponding to smoothing alone, a drying cycle corresponding to smoothing followed by drying, or a sanitizing cycle corresponding to smoothing combined with sanitizing the fabric item(s) placed in the crease-smoothing cabinet 10. For example, a sanitizing cycle can correspond to a higher temperature and/or humidity level and/or cycle time than a smoothing cycle.

The curtain 12 comprises a multilayer textile wall 100 comprising a first layer 101 and a second layer 102. The textile wall 100 can substantially form a sleeve around the curtain axis 12. The first layer 101 is made of a textile material comprising elastic fibers and the second layer 102 is made of a waterproof textile material. FIG. 12 illustrates a non-limiting example of a multilayer textile wall 100 of a curtain 12 of the crease-smoothing cabinet.

The elasticity of the first layer 101 makes it possible to stretch the fabric of the first layer 101 to tension it. The curtain 12 comprising the first layer 101 is thus extensible, and can be expanded and stretched significantly elastically so that when the curtain 12 is expanded, even stretched, the pleats of the curtain 12 are less visible and even eliminated.

In addition, the curtain 12 is collapsible and regains its original shape once expanded. Such a curtain 12 comprising a first elastic layer 101 thus makes it possible to reduce, or even avoid, the appearance of creases on the curtain 12, and to avoid a rumpled appearance of the curtain 12.

The impermeability of the second layer 102 makes it possible to maintain the desired humidity and temperature in the crease-smoothing cabinet 10 during the smoothing process. Moisture is thus contained inside the crease-smoothing cabinet 10, the steam not escaping from the crease-smoothing cabinet 10.

Thus, the humidity level and temperature inside the crease-smoothing cabinet 10 can be determined so as to ensure efficient smoothing of the fabric item placed inside the crease-smoothing cabinet 10, and if necessary to ensure sanitization of the fabric item, such sanitization preferably being achieved when 99.99% of viruses and bacteria are killed. In addition, the second layer 102 follows the collapse and expansion of the curtain 12 and can accommodate the stretching of the curtain 12.

The first layer 101 and the second layer 102 can be superimposed, that is, they are arranged in contact with one another substantially over their entire surface area and stacked on top of one another to form the textile wall 100.

The textile wall 100 can consist of the first layer 101 and the second layer 102. Thus, the textile wall 100 has only two layers, and is therefore easy to manufacture and inexpensive to produce, while ensuring the properties of elasticity, impermeability and reduction in the pleats of the curtain 12. Alternatively, the textile wall 100 can consist of more than two layers.

The first layer 101 can be made of polyester, for example be made of a 100% polyester fabric. The use of polyester gives its elasticity to the first layer 101. Due to the use of polyester, the first layer 101 contributes to the impermeability of the curtain 12.

In particular, the first layer 101 can be made of textured and stretched polyester threads (polyester DTY, Drawn Textured Yarn). The textured and stretched polyester threads have satisfactory elastic properties and give a visual mesh-type appearance to the first layer 101.

The polyester fabric of the first layer 101 can comprise elastane fibers, which makes it possible to increase the elastic characteristic of the first layer 101 due to the elasticity of the elastane. Therefore, the use of fiber elastane in the polyester increases the elasticity of the first layer 101.

The first layer 101 is an outer layer of the textile wall 100; The first layer 101 is then located in a more external position than the second layer 102. In particular, the first layer 101 can be the outermost layer of the textile wall 100. The first layer 101 is therefore visible to the user of the crease-smoothing cabinet 10 and determines the outer appearance of the crease-smoothing cabinet 10.

The second layer 102 can be a waterproof plastic film made of polyurethane (PU). Polyurethane has satisfactory impermeability properties. In addition, polyurethane is suitable for being collapsed and expanded, and if necessary accommodating the stretching of the curtain 12.

The second layer 102 is a thermoplastic polyurethane (TPU) adhesive strip adapted to ensure hot bonding of the first layer 101 onto the second layer 102. The second layer 102 then forms a polyurethane (PU) adhesive, which ensures the placement of the first layer 101 on the second layer 102. In particular, the adhesive strip of the second layer 102 can be hot-bonded to the first layer 101. A method of manufacturing the multilayer textile wall 100 of the curtain 12 of the crease-smoothing cabinet 10 can comprise a step consisting in hot-bonding the first layer 101 onto the second layer 102.

The second layer 102 can be located in a more internal position than the first layer 101. The second layer 102 can be the innermost layer of the textile wall 100 of the curtain 12, or be a central layer of the textile wall 100 arranged between the outermost layer and the innermost layer of the textile wall 100.

The textile wall 100 can further comprise a third layer 103 made of a textile material comprising an elastic fiber. Thus, the third layer 103 further participates in the elasticity of the curtain 12, and in the decrease in the appearance of pleats on the curtain 12.

The textile wall 100 can consist of the first layer 101, the second layer 102 and the third layer 103. Thus, the number of layers of the textile wall 100 remains limited, while making it possible to improve the impermeability, elasticity and/or reduction in the pleats of the curtain 12.

The first layer 101, the second layer 102 and the third layer 103 are superimposed, the first layer 101, second layer 102 and third layer 103 being stacked on top of one another to form the textile wall 100.

The third layer 103 can be the innermost layer of the textile wall 100 of the curtain 12. The third layer 103 is therefore visible to a user, for example when the crease-smoothing cabinet 10 is in an access configuration. The third layer 103 thus conceals the second layer 102 for the user of the crease-smoothing cabinet 10.

The second layer 102 can be arranged between the first layer 101 and the third layer 103. The first layer 101 and the third layer 103 are then located on either side of the second layer 102. The first layer 101 corresponds to the outer layer, the third layer 103 corresponds to the inner layer, and the second layer 102 corresponds to the central layer.

The second layer 102 can be a thermoplastic polyurethane (TPU) adhesive strip adapted to ensure hot bonding of the first layer 101 and the third layer 103 onto the second layer 102. The second layer 102 thus ensures that the first layer 101 and the third layer 103 are bonded in place.

The third layer 103 can be made of polyester, for example in a 100% polyester fabric, for example in textured and stretched polyester threads. The composition of the third layer 103 can be identical to the composition of the first layer 101. Like the first layer 101, the third layer 103 can comprise elastane fibers to increase its elasticity.

The curtain 12 can further comprise a frame comprising a plurality of stays 200, the frame stays 200 being arranged at regular intervals along the textile wall 100. Each portion of the textile wall 100 located between two frame stays 200 has a convex shape, so that the frame and the textile wall 100 ensure accordion folding and unfolding of the curtain 12. FIGS. 1 to 4 illustrate non-limiting examples of crease-smoothing cabinets 10 comprising a curtain 12 comprising a textile wall 100 and a frame comprising a plurality of stays 200.

The construction of the curtain 12 with a textile wall 100 and a frame allows the curtain 12 to be easily produced on an industrial scale, while respecting the constraints of impermeability, pleat reduction, and ease of collapse and expansion of the crease-smoothing cabinet 10.

The stays 200 are arranged at regular intervals along the textile wall 100. The stays 200 are therefore regularly spaced along the curtain axis 12. When the curtain 12 is expanded, the stays 200 stiffen the curtain 12 and hold the textile wall 100 in place.

The accordion folding of the curtain 12 reduces the appearance of creases and random pleats on the curtain 12. Indeed, the curtain 12 folds and unfolds like an accordion bellows. In this way, the points at which creases form when the curtain 12 is collapsed are controlled. In particular, pleats can be formed at junctions between stays 200. The aesthetic appearance of the curtain 12 is therefore improved, since the curtain 12 has a smooth appearance with the pleats arranged at regular intervals, and not a rumpled effect with pleats appearing randomly and the appearance of creases is avoided. In addition, the ease with which the curtain 12 can be collapsed and expanded is improved, as the curtain 12 folds at controlled points.

By convex, it is understood that a portion of the textile wall 100 located between two stays 200 forms an inward pleat of the crease-smoothing cabinet 10, as illustrated as a non-limiting example in FIGS. 5b, 5c and 6c. The pleats are located in internal positions and the stays 200 are located in external positions of the curtain 12. When the curtain 12 is completely collapsed, the frame stays 200 can be substantially stacked on top of one another.

The textile wall 100 can be formed by an assembly of a plurality of panels 110, two adjacent panels 110 being connected to one another at a junction 120, each panel 110 being adapted to ensure the placement of a frame stay 200. A panel 110 is therefore defined by two junctions 120, the junctions 120 being arranged on either side of the panel 110, each junction 120 forming an interface between the panel 110 and an adjacent panel 110.

The pleats of the curtain 12 are formed at the junctions 120 between the panels 110. The pleats are formed towards the inside of the cabinet. In other words, the junctions 120 between the panels 110 define an internal position of the curtain 12, and the frame stays 200 define an external position of the curtain 12.

Each panel 110 located between two junctions 120 can comprise two pieces of panels 110 each extending outward from a respective junction 120 and joining together by forming an angle at a stay 200. The two pieces of a panel 110 can be formed from one piece or connected to one another at the stay 200.

An angle formed between the two pieces of a panel 110 of the curtain 12 is progressively smaller as the curtain 12 is collapsed, and larger as the curtain 12 is expanded. The angle can be close to 0° when the curtain 12 is completely collapsed, the two pieces of the panel 110 then being substantially stacked on top of one another. The angle can be close to 180°, while remaining less than 180°, when the curtain 12 is fully expanded, the two pieces of panel 110 then being arranged substantially in the extension of one another, the panel 110 of the curtain 12 substantially forming a sleeve around the axis of the curtain 12.

Each panel 110 of the textile wall 100 can comprise a sheath 130 arranged at a distance from the junction 120 between said panel 110 and an adjacent panel 110, said sheath 130 being adapted to receive a frame stay 200. The sheath 130 can be arranged substantially equidistant between the two junctions 120 defining the panel 110. The sheaths 130 are arranged at regular intervals along the textile wall 100. Such sleeves 130 ensure that the frame stays 200 are positioned and held in relation to the textile wall 100 at regular intervals along the textile wall 100, so as to ensure the accordion folding of the curtain 12.

The curtain 12 is suitable for being accordion folded and unfolded substantially along the curtain axis 12 orthogonal to the base 11. When the curtain 12 is expanded, the textile wall 100 can form a sleeve extending along the curtain axis 12 and having a substantially oblong cross-section. The textile wall 100 then has a substantially oblong cylindrical shape around the curtain axis 12.

The frame stays 200 can be adapted to extend substantially in a plane perpendicular to the curtain axis 12. The junctions 120 can further extend substantially in a plane perpendicular to the curtain axis 12, with the junctions 120 and the stays 200 being substantially parallel and regularly spaced. Such a construction of the curtain 12 makes it possible to improve the efficacy of the accordion folding and unfolding of the curtain 12, and to reduce the appearance of creases and random pleats.

Each frame stay 200 can have a substantially oblong shape, as illustrated as a non-limiting example in FIGS. 5a and 6b. All frame stays 200 can have substantially the same shape. Thus, the frame stays 200 arranged at regular intervals along the textile wall 100 define a substantially oblong transverse cross-section of the textile wall 100.

A frame stay 200 can be a closed tube with a substantially oblong shape. A stay 200 can be made of metal, plastic, or silicone.

The frame can comprise between five and fifteen stays 200, preferably nine stays 200. The textile wall 100 then comprises nine panels 110 connected to one another at the respective junctions 120, each panel 110 being adapted to ensure the placement of a stay 200, for example in a respective sheath 130. Such a number of stays 200 is particularly suitable for effectively holding the textile wall 100 in place and keeping its shape when the curtain 12 is expanded, and the accordion folding of the curtain 12.

The textile wall 100 can be adapted to be moved linearly along the curtain axis 12 so as to cause the curtain 12 to accordion-fold or unfold. In particular, the user can move the textile wall 100 in translation along the curtain axis 12, so as to collapse or expand the curtain 12.

A sheath 130 can be a tunnel with a suitable shape and dimensions to receive a frame stay 200. The frame stay 200 can be inserted, for example slid, into the sheath 130.

The sheath 130 can be arranged against the textile wall 100, for example by sewing a fabric strap on the textile wall 100, the textile wall 100 forming with the strap the tunnel of the sheath 130 adapted to receive the frame stay 200.

The strap can be substantially rectangular in shape and have a length and width. The strap has a first edge and a second edge opposite the first edge, the first edge and the second edge extending substantially in a direction of the larger dimension, that is to say the length, of the strap. The strap can be sewn to the textile wall 100 over the full length of its first edge and second edge, and be left free for at least part of its width. Thus, the tunnel of the sheath 130 is defined by the textile wall 100, the first edge and the second edge of the strap.

The sheath 130 can be arranged inside the textile wall 100, or alternatively outside the textile wall 100. If the textile wall 100 is multilayered, the sheath 130 can be arranged inside the innermost layer of the textile wall 100, the sheath 130 being an internal sheath.

The textile wall 100 can be formed by two textile half-walls 150 connected to one another, preferably by sewing, each textile half-wall 150 being formed by an assembly of a plurality of half-panels 115 connected at respective half-junctions 125. A textile half wall 150 has a dimension along the curtain axis 12 which is substantially similar to a dimension of the textile wall 100 along the curtain axis 12. The two textile half-walls 150 are sewn together along their entire length along the axis of the curtain 12 so as to form the textile wall 100.

In other words, each half-panel 115 of a first textile half-wall 150 is sewn to a half-panel 115 facing it on a second textile wall 150, the half-panels 115 being thus sewn two-by-two along their dimension in the direction of the curtain axis 12, so that a pair of two half-panels 115 sewn together forms a panel 110 of the textile wall 150. Two half-junctions 125 of two half-panels 115 sewn together extend substantially in the extension of one another so as to form a junction 120.

Each half-panel 115 of a textile half-wall 100 comprises a half-sheath 135 adapted to receive a frame half-stay 205. Two half-sheaths 135 of two half-panels 115 sewn together extend substantially in the extension of one another so as to form a sheath 130.

Each frame stay 200 comprises two frame half-stays 205 each inserted into a half-sheath 135 of a respective half-panel 115 and connected to one another. The frame can further comprise fittings, each fitting being adapted to connect two half-stays 205 to one another so as to form a frame stay 200. If the frame comprises nine stays 200, the frame thus comprises eighteen half-stays 205 connected two-by-two so as to form the nine stays 200.

The design of the curtain 12 with textile half-walls 150 and frame half-stays 205 gives the curtain 12 an ease of production that allows the curtain 12 to be industrially produced on a large scale and at less cost.

The frame can further comprise a first connector 210 for the curtain 12 provided to attach the textile wall 100 to the base 11 of the crease-smoothing cabinet 10, and a second connector 220 for the curtain 12 provided to removably attach the textile wall 100 to the top 13 of the crease-smoothing cabinet 10.

The first connector 210 of the curtain 12 can be attached to the textile wall 100; it can in particular be sewn over a whole perimeter of the first end 121 of the curtain 12, the first end 121 of the curtain 12 corresponding to a lower end of the textile wall 100. The first connector 210 of the curtain 12 is attached to a lower panel 110, that is, to the lowest panel 110, therefore the closest to the base 11 of the textile wall 100. The first connector 210 of the curtain 12 is suitable for securing the first end 121 of the curtain 12 to the base 11. For example, the first connector 210 of the curtain 12 can be screwed to a bottom of the base 11.

The second connector 220 of the curtain 12 can be attached to the textile wall 100; it can in particular be sewn over a whole perimeter of the second end 122 of the curtain 12, the second end 122 of the curtain 12 corresponding to an upper end of the textile wall 100. The second connector 220 of the curtain 12 is attached to an upper panel 110, that is to say to the highest panel 110, therefore the closest to the top 13 of the textile wall 100. The second connector 220 of the curtain 12 is adapted to ensure removable attachment of the second end 122 of the curtain 12 to the top 13. For example, the second connector 220 of the curtain 12 can comprise means of removably attaching the curtain 12 to the top 13, or can be attached to a guide part 15 that comprises means of removably attaching the curtain 12 to the top 13.

The first connector 210 of the curtain 12 and/or the second connector 220 of the curtain 12 can each have substantially oblong and similar shapes. Thus, a perimeter of the expanded curtain 12 is substantially oblong along the full length of the curtain 12 along the curtain axis 12, the expanded curtain 12 substantially forming a sleeve around the curtain axis 12. The first connector 210 of the curtain 12 and/or the second connector 220 of the curtain 12 can be made of plastic.

FIG. 6a illustrates a non-limiting example of a curtain comprising a textile wall 100, and a frame comprising frame stays 200, a first connector 210 of the curtain 12 and a second connector 220 of the curtain 12.

A method for assembling a curtain 12 of a crease-smoothing cabinet 10 as previously described can comprise the following steps:

E1: forming, on each of a plurality of panels 110, a sheath 130 adapted to receive a frame stay 200;

E2: connecting the plurality of panels 110, two adjacent panels 110 being connected to one another at a junction 120 so as to form a textile wall 100; and E3: inserting each frame stay 200 into a respective sheath 130.

The assembly method can comprise the following steps:

E11: on each of a plurality of half-panels 115 of the textile wall 100, sewing a strap forming a half-sheath 135 adapted to receive a frame half-stay 205;

E21: connecting the plurality of half-panels 115, two adjacent half-panels 115 being sewn together at a respective half-junction 125 so as to form a half textile wall 150;

E22: sewing two textile half-walls 150 together so as to form the textile wall 100;

E31: inserting each frame half-stay 205 into a half-sheath 135 of a respective half-panel 115; and E32: connecting the half-stays 205 two-by-two so as to form frame stays 200.

In step E11, the straps can be sewn over the full length of the half-panel 115, substantially equidistant from the two opposite half-junctions 125 of the half-panel 115, so that the half-sheath 135 formed is located substantially equidistant from the two half-junctions 125 of the half-panel 115. FIG. 7 illustrates a non-limiting example of a half-panel 115 on which a strap forming a half-sheath 135 is sewn.

In step E21, nine half-panels 115 of the textile wall 100 can be sewn together at the respective half-junctions 125 so as to form a textile half-wall 150. FIG. 8 illustrates a non-limiting example of a textile half-wall 150 formed by an assembly of half-panels 115 sewn together at the half-junctions 125, each half-panel 115 comprising a half-sheath 135.

In step E22, the two textile half-walls 150 can be sewn together over a whole dimension of the textile half-walls 150 in the direction of the curtain axis 12. Thus, the half-panels 115 of the two textile half-walls 150 are sewn together in pairs along their full length along the axis of the curtain 12. A pair of two half-panels 115 sewn together along their full length along the curtain axis 12 forms a panel 110 of the textile wall 150. The two textile half-walls 150 can also be sewn together on a whole lower end and on a whole upper end of the textile wall 100. FIG. 9 illustrates a non-limiting example of a textile wall 100 formed of two textile half-walls 150 sewn together.

In step E31, eighteen half-stays 205 can be inserted, for example, each half-stay 205 being inserted into one of the eighteen half-sheaths 135. FIG. 10 illustrates a non-limiting example of a textile wall 100 comprising a half-sheath 135 into which a frame half-stay 205 is inserted.

In step E32, the eighteen half-stays 205 can be connected two-by-two so as to form the nine frame stays 200. When connected, the stays 200 can have a substantially oblong shape. FIG. 11 illustrates a non-limiting example of a curtain 12 comprising a textile wall 100 and a frame formed by frame stays 200 obtained by a method described above.

The assembly method can comprise a preliminary step consisting in cutting strips of fabric forming the half-panels 115 of textile wall 100. For a crease-smoothing cabinet 10 comprising nine panels 110 of textile wall 100, eighteen strips of fabric must be cut, so as to form eighteen half-panels 115 of textile wall 100.

The fabric strip is a multilayer strip comprising at least one first layer made of a textile material comprising elastic fibers and a second layer made of a waterproof textile material.

The assembly method can comprise an additional step consisting in ironing the textile wall 100 before inserting the frame stays 200 into the sheaths 130, or the half-stays 205 into the half-sheaths 135, so as to eliminate any pleats formed on the textile wall 100.

The assembly method can further comprise the following step:

E41: sewing a first connector 210 of the curtain 12 along a lower end of the textile wall 100, and E42: sewing a second connector 220 of the curtain 12 onto the textile wall 100 along an upper end of the textile wall 100.

The crease-smoothing cabinet 10 can also include fastening elements for removably attaching the curtain 12 to the top 13. The crease-smoothing cabinet 10 then has:

a working configuration wherein the curtain 12 is attached to the top 13, the curtain 12 being expanded so as to connect the top 13 and the base 11; and an access configuration wherein the curtain 12 is at least partially collapsed and detached from the top 13, so as to provide, between the curtain 12 and the top 13, an open space for receiving an item to be smoothed.

FIG. 1 illustrates a non-limiting example of a crease-smoothing cabinet 10 in the working configuration. FIG. 4 illustrates a non-limiting example of a crease-smoothing cabinet 10 in the access configuration.

The user can thus attach or detach the fastening elements at the top 13 in order to change the crease-smoothing cabinet 10 from one configuration to another. Access to the crease-smoothing cabinet 10 to put the items to be smoothed in place thus does not require any specific means of closing and opening the curtain 12.

The top 13 can comprise a seal suitable for ensuring the impermeability between the curtain 12 and the top 13 when the curtain 12 is attached to the top 13. In this way, the crease-smoothing cabinet 10 in the working configuration forms a sealed, enclosed space, improving the efficacy of the crease-smoothing process.

Once the curtain 12 has been detached from the top 13, simply collapsing the curtain 12 allows the crease-smoothing cabinet 10 to be moved to the access configuration, leaving an open space between the curtain 12 and the top 13 of the crease-smoothing cabinet 10. The user can then place one or more fabric item(s) to be smoothed in the open space.

By expanding the curtain 12 and attaching it to the top 13 of the crease-smoothing cabinet 10, the crease-smoothing cabinet 10 can be moved to the working configuration, with an open space in which the item to be smoothed is positioned becoming the enclosed space of the crease-smoothing cabinet 10. The user can then start an action cycle, such as a drying cycle, a smoothing cycle and/or a sanitizing cycle. The crease-smoothing cabinet 10 then carries out the action cycle without requiring additional action from the user.

In the working configuration, the crease-smoothing cabinet 10 has dimensions adapted to ensure the smoothing of at least one fabric item placed in the enclosed space in the crease-smoothing cabinet 10. In the access configuration, a user can place a garment in the open receiving space.

The crease-smoothing cabinet 10 can further comprise a pole 14 extending between the base 11 and the top 13 to keep the top 13 separated from the base 11. The pole 14 has a structural role for the stability of the crease-smoothing cabinet 10, and a supporting role for keeping the top 13 at a desired distance from the base 11. The distance between the base 11 and the top 13 can be different depending on the configuration of the crease-smoothing cabinet 10.

The crease-smoothing cabinet 10 is mobile, or portable, so the crease-smoothing cabinet 10 can easily be assembled, disassembled and transported by the user. The crease-smoothing cabinet 10 has a weight that is compatible with transport by the user.

The crease-smoothing cabinet 10 thus also has a transport configuration. FIG. 2 illustrates a non-limiting example of a crease-smoothing cabinet 10 in the transport configuration. The pole 14 has an adjustable length so as to keep the top 13 at an adjustable distance from the base 11. In the working configuration and in the access configuration, the pole 14 has a first length. In the transport configuration, the curtain 12 is at least partially collapsed and the pole 14 has a second length strictly less than the first length. The transport configuration therefore facilitates the transport of the crease-smoothing cabinet 10 by a user by reducing the dimensions, in particular along the curtain axis 12, of the crease-smoothing cabinet 10. Indeed, the pole 14 is shorter in the transport configuration than in the working configuration or in the access configuration. In addition, the compact size of the crease-smoothing cabinet 10 in its transport configuration makes it possible to save space when storing the crease-smoothing cabinet 10, for example in a closet.

The pole 14 can be telescopic and comprise a first section 141 of pole 14 attached to the base 11, a second section 142 of pole 14 attached to the top 13, and a junction section 143 connecting the first section 141 of pole 14 and the second section 142 of pole 14. The second section 142 of pole 14 can be retracted into the first section 141 of pole 14, so as to adjust a length of the pole 14. In the working configuration, the first length of the pole 14 corresponds to a cumulative length of the first section 141 of pole 14 and the second section 142 of pole 14. In the access configuration, the second length of the pole 14 corresponds substantially to the length of the first section 141 of pole 14, the second section 142 of pole 14 being retracted into the first section 141 of pole 14.

The crease-smoothing cabinet 10 can comprise two substantially parallel poles 14 arranged on either side of the substantially oblong base 11.

The crease-smoothing cabinet 10 can further comprise a guide part 15 attached to the second end 122 of the curtain 12, more particularly to the second connector 220 of the curtain 12. Said guide part 15 comprises fastening elements for removably attaching the guide part 15 to the top 13, and guide elements for guiding the guide part 15 in translation along the pole 14.

Guiding the translational movement of the guide part 15 makes it easier to expand and collapse the curtain 12, as the user does not have to manage the guidance him/herself, and enables the curtain 12 to be positioned correctly in relation to the top 13, so that the curtain 12 can be easily attached to the top 13, with the expansion of the curtain 12 being guided in such a way that the curtain 12 is in the correct position to be attached to the top 13 once it is expanded.

The fastening elements provided for removably attaching the curtain 12 to the top 13 correspond to the fastening elements of the guide part 15. The fastening elements can be means of clipping the curtain 12 to the top 13, for example a lever comprising a first end forming a hook for clipping the guide part 15 to the top 13 and a second end adapted to be swiveled so as to unclip the guide part 15 from the top 13.

In the working configuration, the guide part 15 is attached to the top 13 by the fastening elements. In the access configuration, the guide part 15 is detached from the top 13.

The method of using the crease-smoothing cabinet 10 can include the following steps:
- expanding the curtain 12 then attaching the guide part 15 or curtain 12 connector to the top 13, in order to change from the access configuration to the working configuration; or
- detaching the guide part 15 or curtain 12 connector from the top 13 then at least partially collapsing the curtain 12, in order to change from the working configuration to the access configuration.

A method of using a portable crease-smoothing cabinet 10 for smoothing creases from at least one fabric item intended to be placed in the crease-smoothing cabinet 10 comprises the following successive steps:
- E1: first steaming by generating and injecting steam into the crease-smoothing cabinet 10 at a first steam flow rate for a non-zero first steaming period;
- E2: second steaming by generating and injecting steam into the crease-smoothing cabinet 10 at a second steam flow rate for a non-zero second steaming period, in which the second steam flow rate is strictly lower than the first steam flow rate; and
- E3: drying by blowing warm air into the crease-smoothing cabinet 10 for a non-zero drying period.

The method can further comprise a step E4 of cooling the article by blowing cold air into the crease-smoothing cabinet 10, the cooling step E4 being carried out following the hot-air blow-drying step E3.

The method can further comprise a preliminary step E0 in which a user sets the parameters of the crease-smoothing cabinet 10, using a parameter-setting unit 50 of the crease-smoothing cabinet 10.

At least one garment-positioning element, such as a rod, hanger 40 and/or at least one clip 41 (shown in FIGS. 3 and 4), can be added and removably secured to the top 13 of the crease-smoothing cabinet 10. The fabric item can be placed on a hanger 40 or attached to the attachment clip 41.

The invention claimed is:

1. A crease-smoothing cabinet, comprising:
   a base;
   a top extending opposite and at a distance from the base; and
   an expandable curtain configured to extend between the base and the top, so that the base, the top and the curtain together define an enclosed space in the crease-smoothing cabinet when the curtain is expanded and attached to the base and the top,
   wherein the curtain comprises a multilayer textile wall comprising a first layer and a second layer, wherein the first layer comprises a textile material comprising elastic fibers and textured and stretched polyester thread and the second layer comprises a waterproof material.

2. The crease-smoothing cabinet according to claim 1, wherein the first layer is an outer layer of the textile wall.

3. The crease-smoothing cabinet according to claim 1, wherein the second layer is a waterproof plastic film comprising polyurethane (PU).

4. The crease-smoothing cabinet according to claim 3, wherein the second layer is a thermoplastic polyurethane adhesive strip (TPU) configured to ensure hot bonding of the first layer onto the second layer.

5. The crease-smoothing cabinet according to claim 1, wherein the textile wall further comprises a third layer comprising a textile material comprising an elastic fiber.

6. The crease-smoothing cabinet according to claim 5, wherein the third layer comprises polyester.

7. The crease-smoothing cabinet according to claim 5, wherein the second layer is arranged between the first layer and the third layer.

8. The crease-smoothing cabinet according to claim 1, wherein the curtain further comprises a frame, the textile wall and the frame configured to ensure accordion-folding and unfolding of the curtain.

9. The crease-smoothing cabinet according to claim 1, further comprising fastening elements for removably attaching the curtain to the top, wherein the crease-smoothing cabinet has:
- a working configuration wherein the curtain is attached to the top, the curtain being expanded so as to connect the top and the base; and
- an access configuration wherein the curtain is at least partially collapsed and detached from the top, so as to arrange between the curtain and the top an open space for receiving an item to be smoothed.

10. A method of using a crease-smoothing cabinet according to claim 9, comprising the following steps:
- expanding the curtain then attaching the curtain to the top, in order to change from the access configuration to the working configuration; or
- detaching the curtain from the top then at least partially collapsing the curtain, to change from the working configuration to the access configuration.

11. A crease-smoothing cabinet, comprising:
a base;
a top extending opposite and at a distance from the base; and
an expandable curtain configured to extend between the base and the top, so that the base, the top and the curtain together define an enclosed space in the crease-smoothing cabinet when the curtain is expanded and attached to the base and the top,
wherein the curtain comprises a multilayer textile wall comprising a first layer and a second layer, wherein the first layer comprises a textile material comprising elastic fibers and the second layer comprises a waterproof material, and
wherein the first layer is an outer layer of the textile wall.

12. A crease-smoothing cabinet, comprising:
a base;
a top extending opposite and at a distance from the base; and
an expandable curtain configured to extend between the base and the top, so that the base, the top and the curtain together define an enclosed space in the crease-smoothing cabinet when the curtain is expanded and attached to the base and the top,
wherein the curtain comprises a multilayer textile wall comprising a first layer and a second layer, wherein the first layer comprises a textile material comprising elastic fibers and the second layer comprises a waterproof material, and
wherein the textile wall further comprises a third layer comprising a textile material comprising an elastic fiber.

* * * * *